(12) United States Patent
Kageyama et al.

(10) Patent No.: US 9,013,056 B2
(45) Date of Patent: Apr. 21, 2015

(54) BACKUP POWER SOURCE DEVICE AND AUTOMOBILE EQUIPPED WITH SAME

(71) Applicant: Panasonic Corporation, Osaka (JP)

(72) Inventors: Youichi Kageyama, Mie (JP); Keiji Azuma, Mie (JP); Hirohumi Oosawa, Fukui (JP); Masafumi Nakamura, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/373,033

(22) PCT Filed: Feb. 8, 2013

(86) PCT No.: PCT/JP2013/000696
§ 371 (c)(1),
(2) Date: Jul. 18, 2014

(87) PCT Pub. No.: WO2013/125170
PCT Pub. Date: Aug. 29, 2013

(65) Prior Publication Data
US 2015/0001926 A1    Jan. 1, 2015

(30) Foreign Application Priority Data

Feb. 22, 2012  (JP) ................................ 2012-035904
Oct. 30, 2012  (JP) ................................ 2012-238658

(51) Int. Cl.
| | | |
|---|---|---|
| *B60R 16/033* | (2006.01) | |
| *H02J 9/06* | (2006.01) | |
| *E05B 77/54* | (2014.01) | |
| *E05B 81/86* | (2014.01) | |
| *B60L 1/12* | (2006.01) | |

(52) U.S. Cl.
CPC ................. *B60R 16/033* (2013.01); *H02J 9/06* (2013.01); *E05B 77/54* (2013.01); *E05B 81/86* (2013.01)

(58) Field of Classification Search
USPC ........................................................ 307/10.1
See application file for complete search history.

(56) References Cited

U.S. PATENT DOCUMENTS

| | | | |
|---|---|---|---|
| 2001/0019227 A1 | 9/2001 | Girard | |
| 2008/0111423 A1* | 5/2008 | Baker et al. ...................... | 307/64 |
| 2010/0052337 A1* | 3/2010 | Arabia et al. ................. | 292/216 |

FOREIGN PATENT DOCUMENTS

| | | |
|---|---|---|
| EP | 1130202 | 9/2001 |
| EP | 1394342 | 3/2004 |
| FR | 2845837 | 4/2004 |
| JP | 4-024145 | 1/1992 |
| JP | 7-269208 | 10/1995 |
| JP | 9-310669 | 12/1997 |

(Continued)

OTHER PUBLICATIONS

International Search Report of PCT Application No. PCT/JP2013/000696 dated Apr. 9, 2013.

(Continued)

*Primary Examiner* — Robert Deberadinis
(74) *Attorney, Agent, or Firm* — Panasonic Patent Center

(57) ABSTRACT

A backup power source device includes the following elements: a capacitor; a charging circuit provided in the charging path of the capacitor and performing step-down operation; a boost circuit provided in the output path of the capacitor; and a door-lock-releasing output terminal connected to the boost circuit.

5 Claims, 12 Drawing Sheets

(56) References Cited

FOREIGN PATENT DOCUMENTS

| | | |
|---|---|---|
| JP | 11-275770 | 10/1999 |
| JP | 2010-216268 | 9/2010 |

OTHER PUBLICATIONS

The Partial Supplementary European Search Report dated Feb. 13, 2015 for the related European Patent Application No. 13752028.4.

* cited by examiner

BACKUP POWER SOURCE DEVICE AND AUTOMOBILE EQUIPPED WITH SAME

CROSS-REFERENCE TO RELATED APPLICATIONS

The present application is a U.S. national stage application of PCT International Application No. PCT/JP2013/000696 filed on Feb. 8, 2013, and claims the benefit of foreign priority to Japanese patent applications 2012-238658 filed on Oct. 30, 2012 and 2012-035904 filed on Feb. 22, 2012, the contents all of which are incorporated by reference.

TECHNICAL FIELD

The present invention relates to a backup power source device for use in various vehicles and to an automobile equipped with the backup power source device.

BACKGROUND ART

FIG. 12 is a circuit block diagram of conventional backup power source device 5. Backup power source device 5 includes body case 1, capacitor 2, charging circuit 3, and output terminal 4. Capacitor 2 and charging circuit 3 are provided inside body case 1. Charging circuit 3 is provided in the charging path of capacitor 2. Output terminal 4 is provided in the output path of capacitor 2.

Power source (battery) 6 installed in an automobile cannot supply starting voltage to airbag starting circuit 7, in case where the battery is damaged by an accident, for example. In this case, backup power source device 5 supplies the starting voltage to airbag starting circuit 7 by discharging the electric charge accumulated in capacitor 2 thereof.

Airbag starting circuit 7 is started at the starting voltage supplied from backup power source device 5, and thereby airbag device 8 is operated. As a result, in case of an accident, backup power source device 5 can operate airbag device 8, thereby ensuring the safety of the passengers. For instance, Patent Literature 1 is known as information on the prior art documents related to this technique.

CITATION LIST

Patent Literature

PTL1 Japanese Patent Unexamined Publication 1104-24145

SUMMARY OF THE INVENTION

A backup power source device includes the following elements:
  a capacitor;
  a charging circuit;
  a boost circuit; and
  a door-lock-releasing output terminal.

The charging circuit is provided in the charging path of the capacitor and steps down an input voltage of the charging circuit. The boost circuit is provided in the output path of the capacitor. The door-lock-releasing output terminal is connected to the boost circuit.

With this configuration, the backup power source device can appropriately supply electric power for releasing door locks in case of emergency.

DESCRIPTION OF EMBODIMENTS

Hereinafter, exemplary embodiments of the present invention are described with reference to the accompanying drawings.

First Exemplary Embodiment

Figure 1:
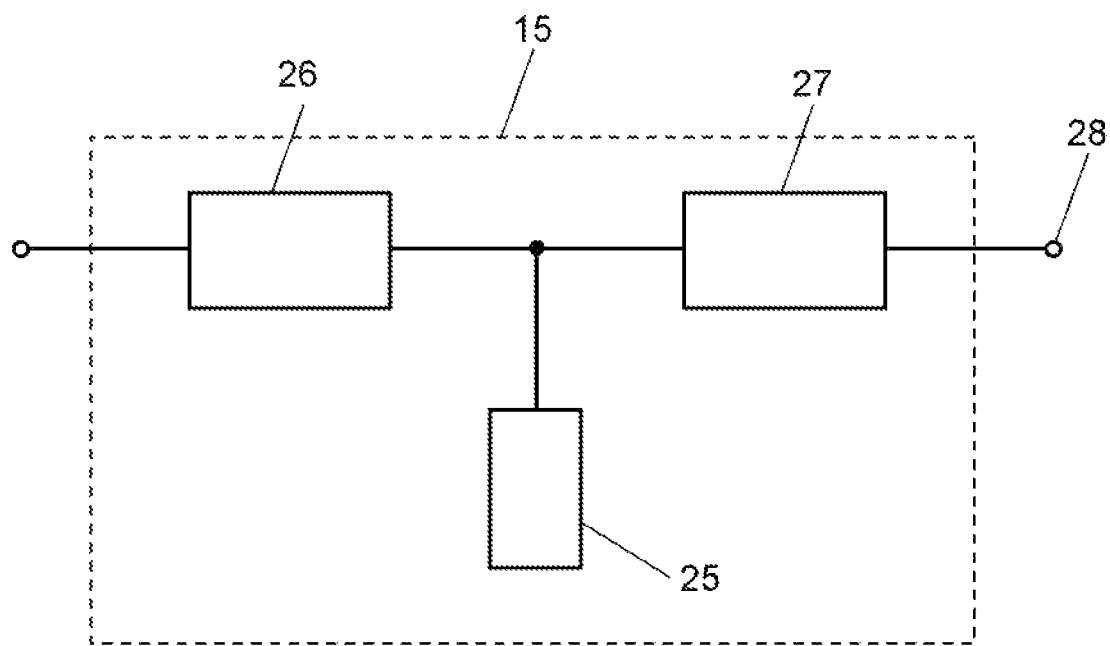
FIG. 1 is a block diagram showing an example of a backup power source device in accordance with a first exemplary embodiment of the present invention.

FIG. 1 is a block diagram showing an example of a backup power source device in accordance with the first exemplary embodiment of the present invention. Backup power source device 15 includes capacitor 25, charging circuit 26, boost circuit 27, and door-lock-releasing output terminal 28. Charging circuit 26 is provided in the charging path of capacitor 25 and steps down an input voltage of charging circuit 26. Boost circuit 27 is provided in the output path of capacitor 25. Door-lock-releasing output terminal 28 is connected to boost circuit 27.

With this configuration, the backup power source device can appropriately output electric power for releasing the door locks from the door-lock-releasing output terminal in case of emergency.

That is, in case of emergency where battery 22 (see FIG. 4) is damaged by an accident, for example, boost circuit 27 boosts the voltage of capacitor 25 and the boosted voltage is supplied from door-lock-releasing output terminal 28 to motors 19 for releasing the door locks. As a result, each motor 19 is started at a sufficiently high voltage, which can appropriately release the door lock in case of emergency. Thus, passengers can make emergency escape from automobile interior 10 to the outside. This enhances the safety.

Figure 2:
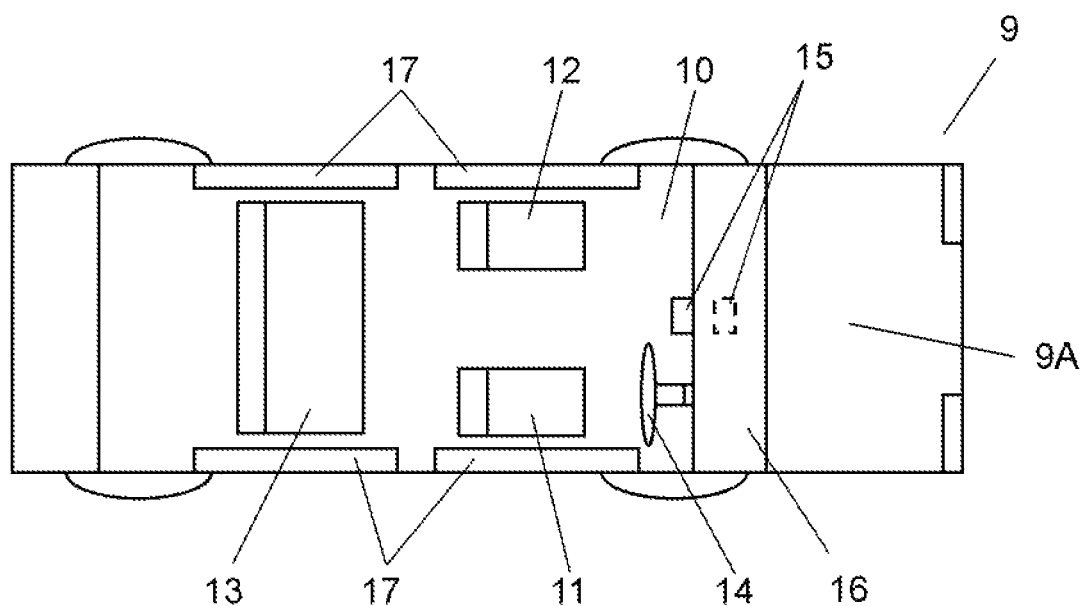
FIG. 2 is a plan view showing an example of an automobile equipped with the backup power source device in accordance with the first exemplary embodiment.

Hereinafter, backup power source device 15 is detailed. FIG. 2 is a plan view showing an example of an automobile equipped with backup power source device 15. Driver's seat 11 and front passenger seat 12 are provided on the front side of automobile interior 10 formed of automobile body 9A of automobile 9. Rear seat 13 is provided on the rear side of automobile interior 10. Further, steering wheel 14 and dashboard 16 are provided in front of driver's seat 11 in automobile interior 10.

Backup power source device 15 is disposed on the front side of automobile interior 10 between driver's seat 11 and front passenger seat 12, for example. Alternatively, the backup power source device is housed in dashboard 16 on the front side of automobile interior 10. Particularly, backup power source device 15 housed in dashboard 16 is less susceptible to changes in ambient temperature. This can suppress deterioration of the characteristics and life of backup power source device 15 caused by heat.

Backup power source device 15 operates when automobile 9 is under an emergency situation. The details thereof will be described later.

Figure 3:
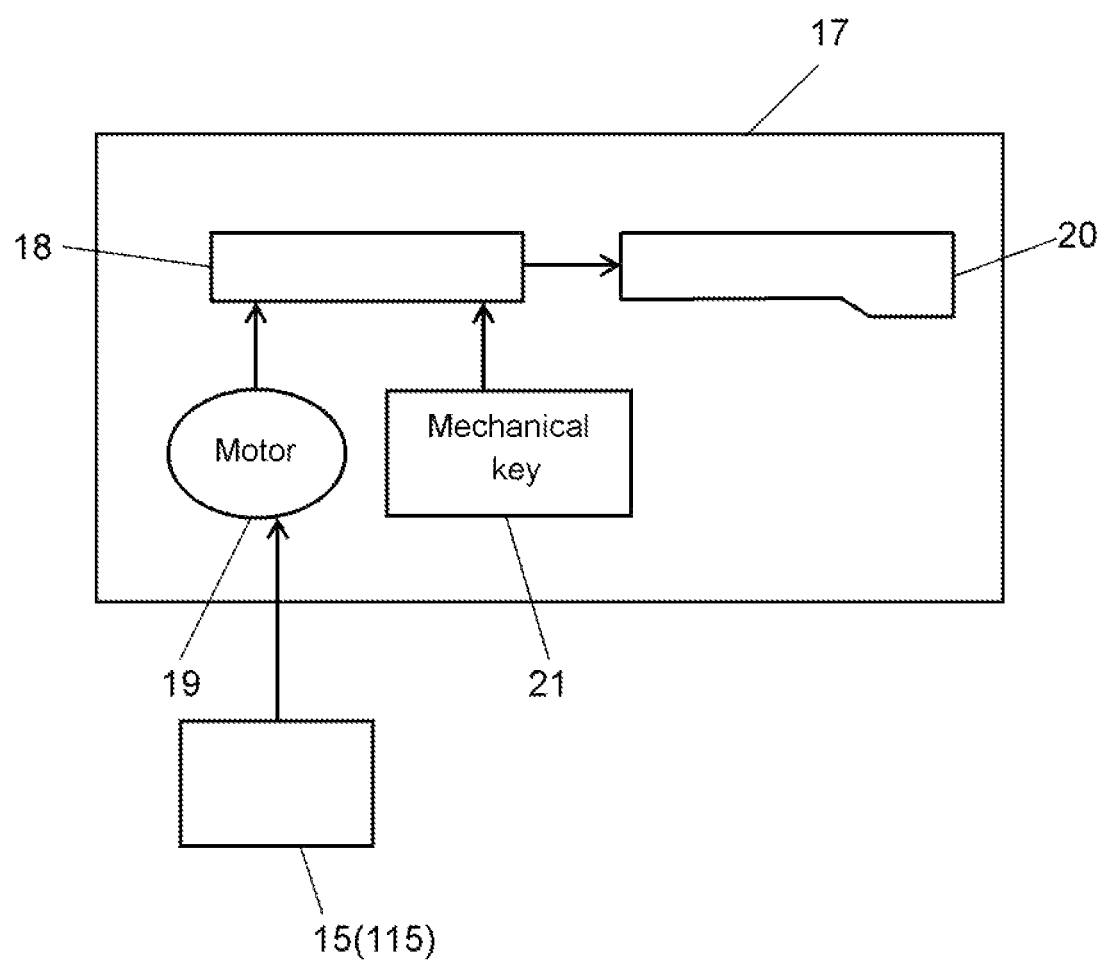
FIG. 3 is a block diagram showing an example of the relation between the backup power source device and a door in accordance with the first exemplary embodiment.

FIG. 3 is a block diagram showing an example of the relation between backup power source device 15 and door 17. Door 17 includes door lock 18, motor 19, door knob 20, and mechanical key 21. Backup power source device 15 is connected to motor 19 of each door 19. In response to driving of motor 19, door lock 18 unlocks door 17.

When the driver, for example, manually operates door knob 20, door lock 18 can unlock or lock door 17. Also when the driver, for example, operates mechanical key 21, door lock 18 can unlock or lock door 17.

Motor 19 is automatically started when automobile 9 reaches a predetermined speed. In response to driving of motor 19, door lock 18 locks door 17. Only in case of emergency, backup power source device 15 operates and drives each motor 19, so that door lock 18 unlocks door 17.

Figure 4:
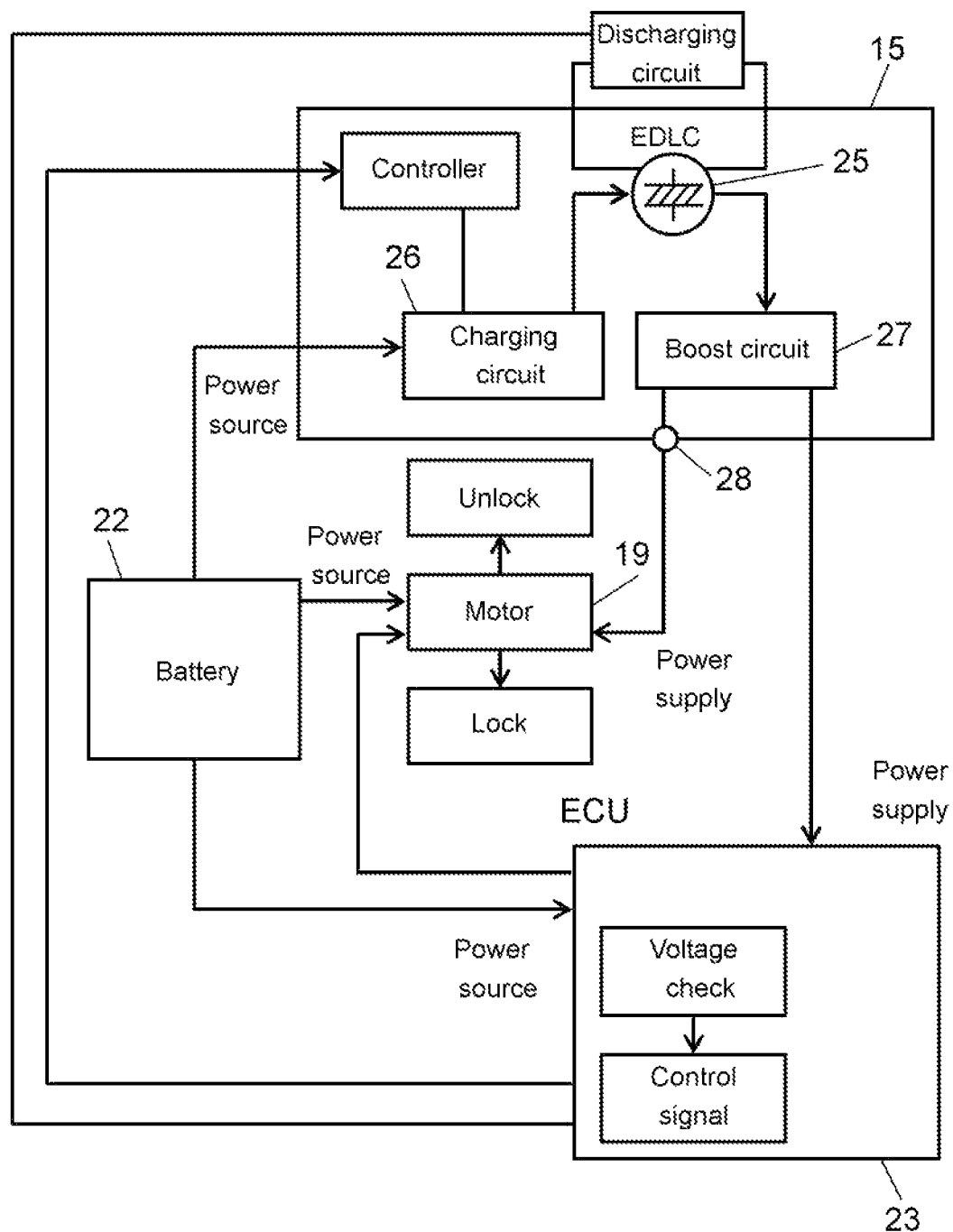
FIG. 4 is a block diagram showing an example of the relation between the backup power source device and a door-lock function part in accordance with the first exemplary embodiment.
Figure 5:
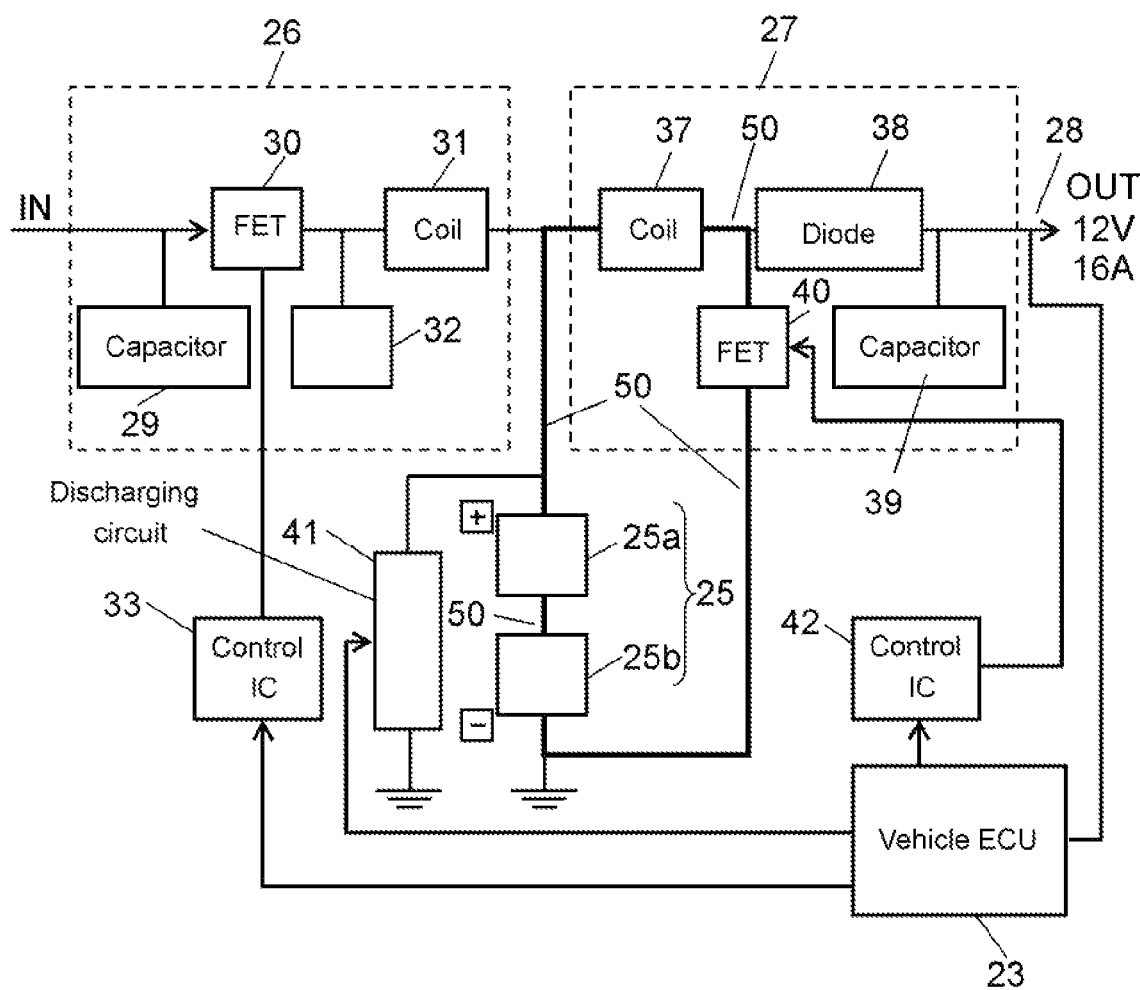
FIG. 5 is a block diagram showing an example of the relation between the backup power source device and a control unit of the automobile in accordance with the first exemplary embodiment.
Figure 6:
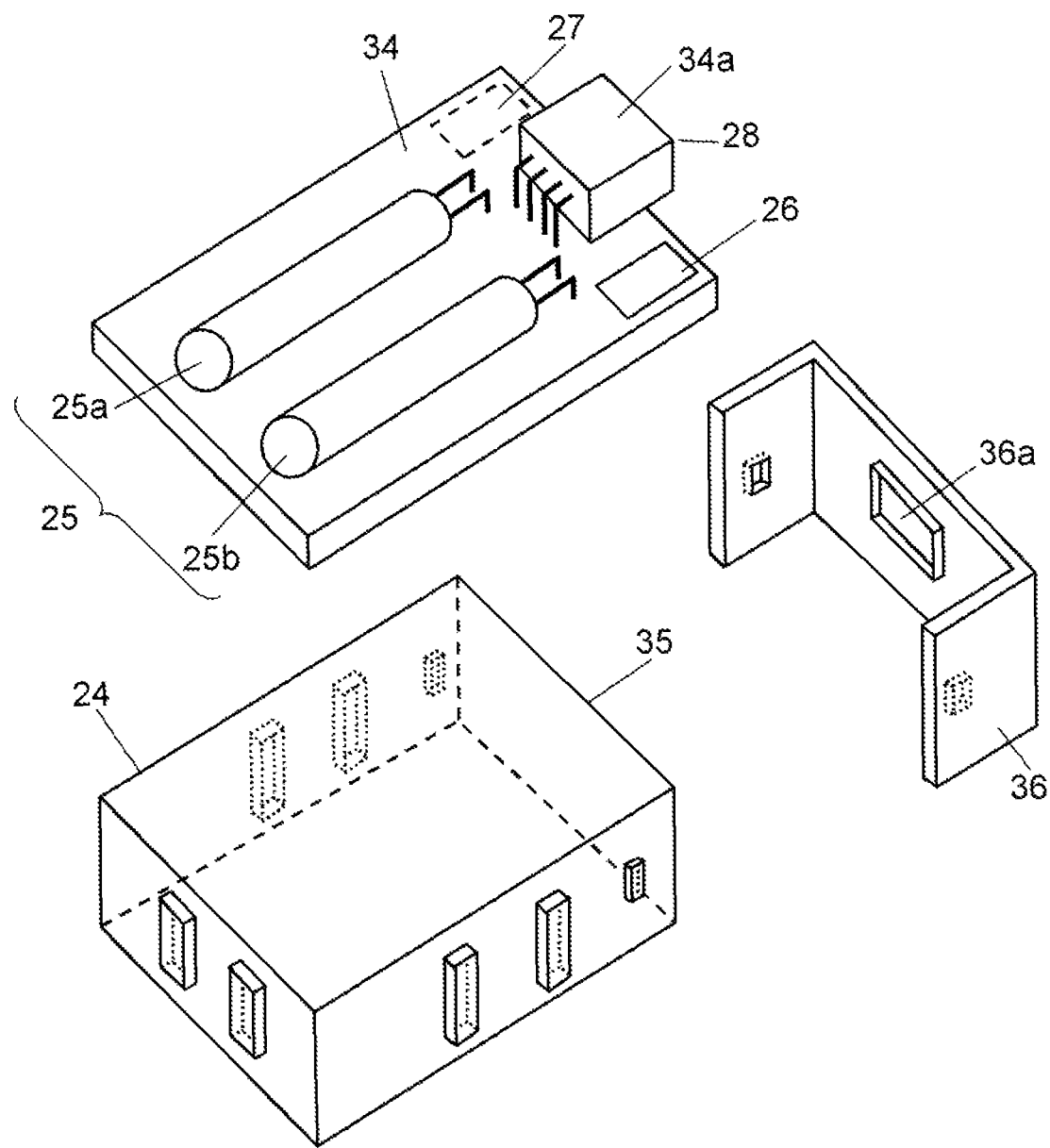
FIG. 6 is an exploded perspective view showing an example of the backup power source device in accordance with the first exemplary embodiment.

FIG. 4 is a block diagram showing an example of the relation between backup power source device 15 and each function part related to locking of door 17. FIG. 5 is a block diagram showing an example of the relation between backup power source device 15 and a control unit of the automobile, and shows the configurations of charging circuit 26 and boost circuit 27. FIG. 6 is an exploded perspective view of backup power source device 15. As shown in FIG. 4, backup power source device 15 is connected to battery 22 and vehicle electronic control unit (ECU) 23 of automobile 9. Vehicle ECU 23 is a unit for controlling electronic equipment for locking doors, illumination, and giving alarms, for example.

As shown in FIG. 4 and FIG. 6, backup power source device 15 includes body case 24, capacitor 25, charging circuit 26, boost circuit 27, and door-lock-releasing output terminal 28. Capacitor 25 is housed in box-shaped body case 24. Charging circuit 26 is provided in the charging path of capacitor 25. Boost circuit 27 is provided in the output path of capacitor 25. Door-lock-releasing output terminal 28 is disposed inside connector 34a, and connected to boost circuit 27.

Preferably, an electric double layer capacitor is used as capacitor 25. The electric double layer capacitor has a large capacity and can be charged rapidly. Further, the discharge cycle life thereof can be lengthened. For these reasons, the electric double layer capacitor is preferable as capacitor 25. Capacitor 25 includes series-connected first capacitor 25a and second capacitor 25b.

As shown in FIG. 4, charging circuit 26 steps down the voltage supplied from battery 22, i.e. a main electric power source, and supplies the stepped-down voltage to capacitor 25. As shown in FIG. 5, charging circuit 26 includes capacitor 29, switching element 30, choke coil 31, and diode 32. Charging circuit 26 is a step-down DC-DC converter, for example. Charging circuit 26 charges capacitor 25 at a constant current or at a constant voltage. In the order of charging operations in charging circuit 26, first, capacitor 25 is charged at the constant current. When the charging current is equal to or larger than a predetermined value, control element 33 controls switching element 30 such that the charging current is reduced to the predetermined value or smaller, and switches the constant current operation to a constant voltage operation. With these operations, capacitor 25 can be charged so as not to be in an overcharged state, and thus has a long life. This can enhance the reliability of backup power source device 15.

Switching element 30 is formed of a field-effect transistor (FET), for example, and connected to vehicle ECU 23 via control element 33, e.g. a control integrated circuit (IC).

Figure 7A:
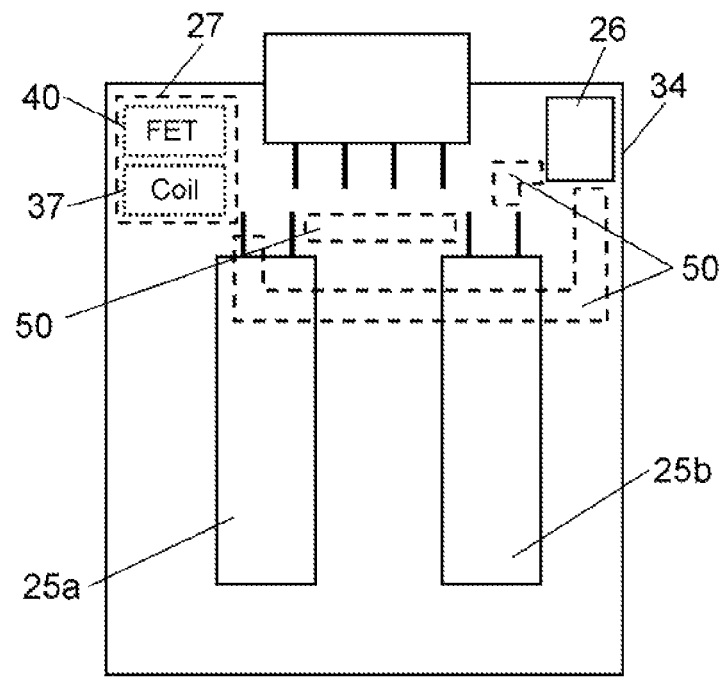
FIG. 7A is a top view showing an example of a substrate having a circuit part of the backup power source device mounted thereon in accordance with the first exemplary embodiment.
Figure 7B:
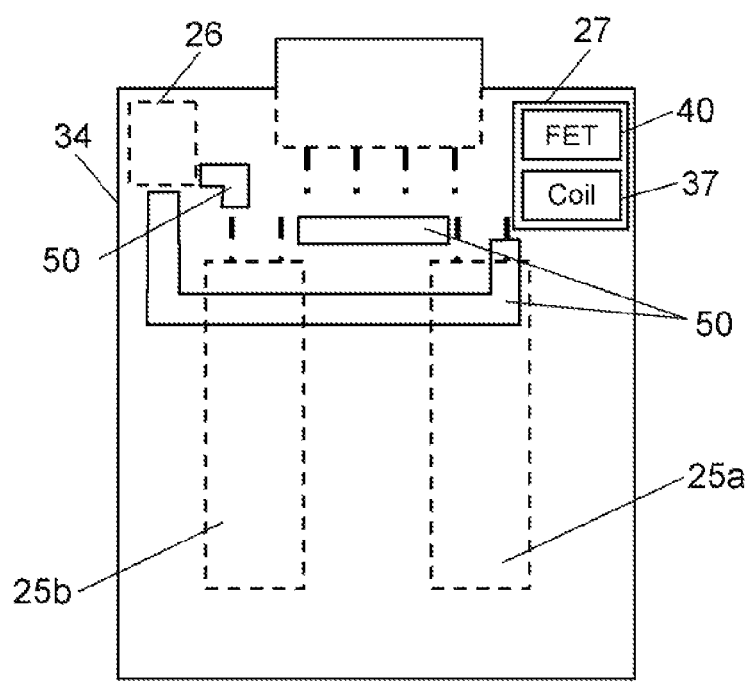
FIG. 7B is a backside view showing an example of the substrate having a circuit part of the backup power source device mounted thereon in accordance with the first exemplary embodiment.

FIG. 7A is a top view of a substrate having a circuit part of backup power source device 15 mounted thereon. FIG. 7B is a backside view of the substrate having a circuit part of backup power source device 15 mounted thereon.

Switching element 40, boost coil 37, and discharge pattern 50 are disposed on a first side of substrate 34. Capacitors 25a and 25b, and charging circuit 26 are disposed on a second side, i.e. the backside of substrate 34. Substrate 34 shown in FIG. 6 is inserted into body case 24 from end opening 35 provided at one end of body case 24. Thereafter, end opening 35 is closed by lid 36.

As described above, boost circuit 27 and discharge pattern 50 are disposed on the first side of substrate 34. Capacitors 25a and 25b and charging circuit 26 are disposed on the second side of substrate 34. This configuration can inhibit noise caused by charging control from affecting the side of boost circuit 27. Further, boost circuit 27 and discharge pattern 50 are disposed on the side different from the side on which capacitors 25a and 25b are disposed. Thus, the heat generated in boost circuit 27 and discharge pattern 50 is hardly transferred to capacitors 25a and 25b. This configuration can suppress deterioration of the characteristics and life of capacitors 25a and 25b caused by heat. Further, capacitors 25a and 25b are isolated by body case 24 from the outside thereof, and thus are less susceptible to changes in ambient temperature. This configuration can suppress deterioration of the characteristics and life of capacitors 25a and 25b caused by heat.

Connector 34a is disposed at an end of substrate 34. Connector 34a connects vehicle ECU 23 of FIG. 5 and substrate 34 of FIG. 6. Lid 36 has opening 36a that faces connector 34a.

Next, a description is provided for boost circuit 27 shown in FIG. 5. Boost circuit 27 is disposed between choke coil 31 of charging circuit 26 and door-lock-releasing output terminal 28. Boost circuit 27 includes boost coil 37, diode 38, smoothing capacitor 39, and switching element 40. Boost coil 37 is series-connected to choke coil 31 and door-lock-releasing output terminal 28 therebetween. Smoothing capacitor 39 is parallel-connected to diode 38 and door-lock-releasing output terminal 28 therebetween.

Switching element 40 formed of a FET, for example, is connected between boost coil 37 and diode 38. With this configuration, a closed loop is formed by switching element 40, boost coil 37, and capacitors 25a and 25b.

In normal operation of an automobile, whereas switching element 30 in charging circuit 26 always charges capacitor 25, switching element 40 in boost circuit 27 may stop or always boost the output voltage of charging circuit 26. This boosting operation is instructed by vehicle ECU 23. In normal operation of the automobile, a circuit for discharging capacitor 25 by a short circuit is not used. That is, vehicle ECU 23 instructs capacitor 25 to maintain a charged state while the engine installed in the automobile is in operation.

Further, discharging circuit 41 is connected to capacitor 25. Discharging circuit 41 is connected to vehicle ECU 23. When vehicle ECU 23 detects that the engine is stopped, discharging circuit 41 gradually discharges the electric charge of capacitor 25. At this time, discharging circuit 41 does not discharge the electric charge of capacitor 25 completely, and stops this discharge in the state where predetermined electric charge is left. This will be detailed later.

As shown in FIG. 5, switching element 40 is connected to vehicle ECU 23 via control element 42, which is formed of a control IC, for example.

Figure 8:
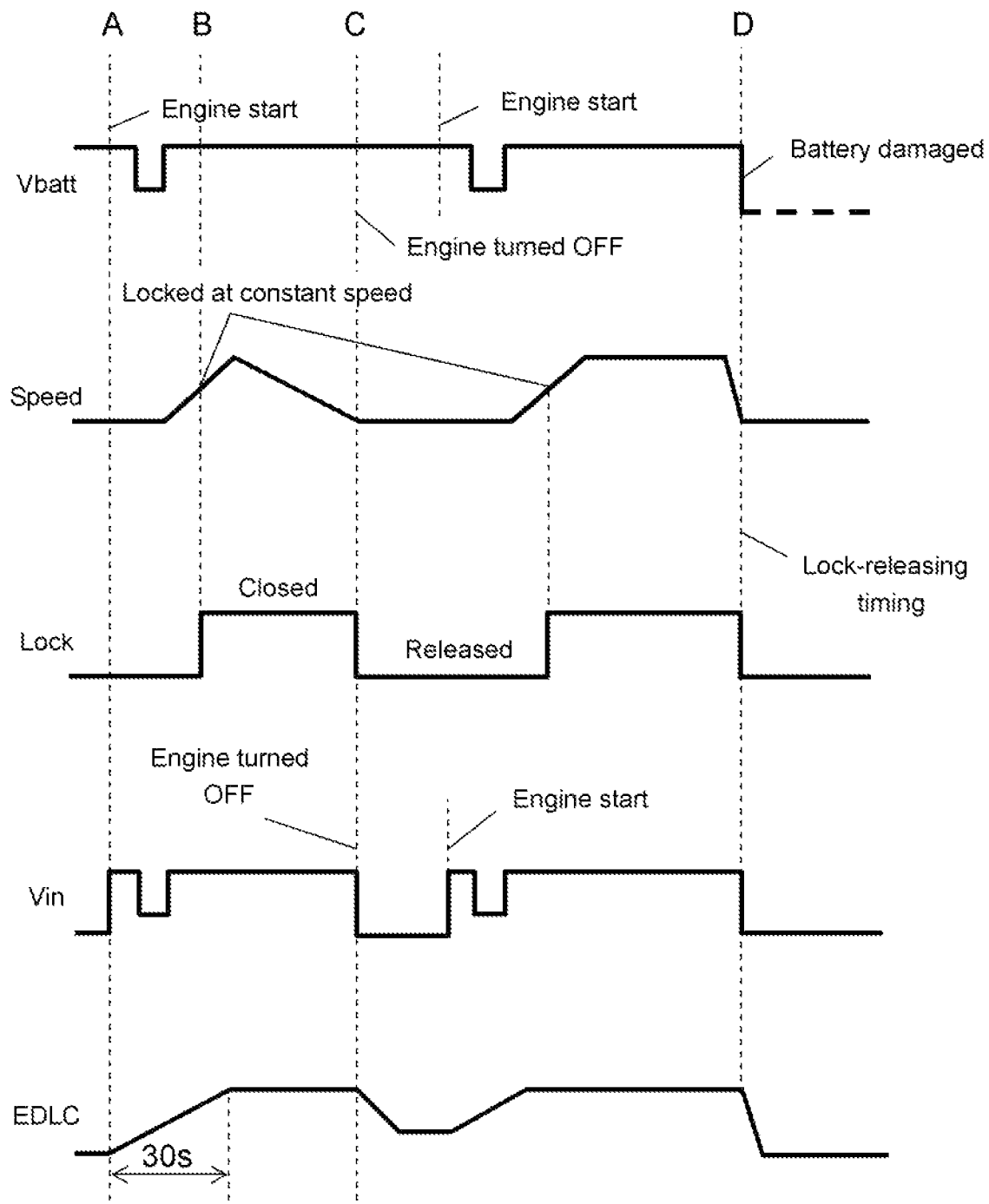
FIG. 8 is a time-sequence diagram showing an example of operating states of the automobile equipped with the backup power source device and a door lock in accordance with the first exemplary embodiment.

Next, with reference to FIG. 8, a description is provided for the operations in the configurations shown in FIG. 1 through FIG. 7B.

FIG. 8 is a time-sequence diagram showing an example of operating states of the automobile equipped with the backup power source device and a door lock.

The curve of "Vbatt" shows variations in the voltage of the battery, i.e. a main electric power source. The curve of the speed shows changes in automobile speed. The curve of "Lock" shows changes in door lock state, i.e. closed or released. The curve of "Vin" shows variations in the voltage of the charging circuit given from the battery. The curve of "EDLC" shows variations in the charging voltage of the capacitor.

In normal use of automobile 9, first, the engine is started at point A in FIG. 8. Battery 22 shown in FIG. 4 is in a normal state. Thus, as shown by the Vbatt curve, only a slight variation occurs at the start of the engine, and variations in voltage are small.

After the start of the engine, battery 22 supplies electric power to charging circuit 26 as shown by the Vin curve in FIG. 8.

Specifically, vehicle ECU 23 of FIG. 4 is started by electric power supply from battery 22. With this configuration, switching element 30 of FIG. 5 is controlled via control element 33. As a result, switching element 30 is switched to the ON state.

At this time, since electric power is also supplied from battery 22 to charging circuit 26, charging circuit 26 is started. As a result, capacitor 25 is gradually charged as shown by the EDLC curve in FIG. 8.

However, only when capacitor 25 is charged for the first time (in production) or is left for an extended period of time after use, the capacitor takes a longer time to be charged. For instance, as shown in the EDLC curve in FIG. 8, it takes approximately 30 seconds to fully charge capacitor 25. However, since predetermined electric charge is left in capacitor 25 as described above, the time taken to charge capacitor 25 is shortened in a normal use situation. Thus, the heat generated in the charging time can be reduced. This can suppress deterioration of the characteristics and life of capacitor 25 caused by the heat. Further, since the time taken to charge is short, the time period during which backup power source device 15 is appropriately operating starts immediately after the start of the engine. This lengthens the time period during which passengers can make emergency escape under the condition that backup power source device 15 appropriately operates because the time period starts immediately after the start of the engine.

In the situation where charging of capacitor 25 proceeds due to the start of the engine, when the running speed of automobile 9 exceeds a predetermined value as shown by the speed curve in FIG. 8 (at point B), each door 17 in FIG. 2 is locked as shown by the lock curve in FIG. 8.

Specifically, motor 19 shown in FIG. 4 is started by vehicle ECU 23, and door lock 18 shown in FIG. 3 is operated by motor 19. Thereby, door 17 shown in FIG. 2 is locked. Motor 19 is used as an example of the element (component) for releasing door lock 18.

As shown by the EDLC curve in FIG. 8, charging of capacitor 25 in normal driving is completed with a lapse of time. When the engine becomes the OFF state (at point C) in FIG. 8, discharging circuit 41 shown in FIG. 5 starts to discharge capacitor 25.

For instance, discharging circuit 41 is started by vehicle ECU 23 and gradually discharges the electric charge of capacitor 25. When capacitor 25 is left in the fully charged state, the characteristics thereof deteriorate. In order to avoid deterioration, discharging circuit 41 gradually discharges capacitor 25 every time the engine becomes the OFF state.

However, all the electric charge of capacitor 25 is not discharged and a predetermined amount of electric charge is left as shown by the EDLC curve in FIG. 8. Thus, in the next charging time and thereafter, the time taken to fully charge capacitor 25 is shorter than 30 seconds in the initial charging time shown by the EDLC curve. Therefore, capacitor 25 can smoothly reach the fully charged state.

When the engine becomes the OFF state, electric power supply from battery 22 to charging circuit 26 is stopped as shown by the Vin curve in FIG. 8. However, capacitor 25 supplies electric power to vehicle ECU 23 through boost coil 37, diode 38, and door-lock-releasing output terminal 28 as shown in FIG. 5, and thus vehicle ECU 23 can continue the control operation.

That is, the electric charge accumulated in capacitor 25 is gradually discharged by discharging circuit 41. Therefore, in the period until capacitor 25 is completely discharged, capacitor 25 continues electric power supply to vehicle ECU 23 via boost coil 37, diode 38, and door-lock-releasing output terminal 28. As a result, vehicle ECU 23 can continue the control operation.

The maximum advantage of backup power source device 15 is as follows. In the state where electric power supply from battery 22 to each part is stopped due to an accident, for example, in driving of automobile 9, backup power source device 15 starts each motor 19 and drives door lock 18. This operation unlocks door 17. In this specification, "in driving" means "in the state where the engine is started" and includes "in running" and "in halting".

Specifically, when an accident occurs and battery 22 is damaged in driving of automobile 9, electric power supply from battery 22 to vehicle ECU 23 is stopped as shown by the Vbatt curve and the Vin curve in FIG. 8 (at point D) and in FIG. 4. However, as understood from FIG. 3, FIG. 4 and FIG. 5, since capacitor 25 supplies electric power to vehicle ECU 23 via boost coil 37, diode 38, and door-lock-releasing output terminal 28, vehicle ECU 23 can continue the control operation. At this time, vehicle ECU 23 has the information that "a voltage drop has occurred" with the previous information that "the engine is started". This is because the engine is stopped not by the driver but by damage of battery 22.

As a result, vehicle ECU 23 determines that the drop in the voltage from battery 22 is caused by damage of battery 22.

At this time, since vehicle ECU 23 stops discharging circuit 41 based on the determination that battery 22 is damaged by an accident, and thus discharging circuit 41 does not discharge the electric charge of capacitor 25.

Therefore, in the period until the electric charge of capacitor 25 runs out, capacitor 25 continues electric power supply to vehicle ECU 23. As a result, vehicle ECU 23 can continue the control operation. Capacitor 25 supplies electric power to vehicle ECU 23 via boost coil 37, diode 38, and door-lock-releasing output terminal 28.

Based on the determination that the voltage of battery 22 has been dropped by an accident, vehicle ECU 23 instructs control element 42 to set switching element 40 to the ON state.

This instruction brings both ends of capacitor 25 into a short-circuited state. That is, capacitor 25, switching element 40, and boost coil 37 are serially short-circuited by discharge pattern 50, and thus the electric charge accumulated in capacitor 25 is supplied to the boost circuit. Thus, capacitor 25 supplies electric current at a large value to discharge pattern 50. Discharge pattern 50 has a current-carrying capacity and cross-sectional area larger than those of wiring patterns 51 of charging circuit 26 and boost circuit 27. For instance, capacitor 25 supplies a current at 2 (V) and 100 (A) to discharge pattern 50. Boost circuit 27 starts in response to the instruction from vehicle ECU 23. Based on this large current, the boost circuit supplies a predetermined voltage to door-lock-releasing output terminal 28. For instance, boost circuit 27 provides a power supply at 12 (V) and 16 (A).

This electric power is supplied from door-lock-releasing output terminal 28 to each motor 19. As a result, door lock 18 shown in FIG. 3 is operated and doors 17 shown in FIG. 2 are unlocked.

In conventional backup power source device 5, capacitor 2 is simply discharged in case of emergency, and thus the voltage is low. However, the equipment for ensuring safety, e.g. airbag starting circuit 7, is driven at a high voltage. Thus, it is possible that conventional backup power source device 5 cannot drive such equipment appropriately in case of emergency, such as occurrence of an accident.

In order to address this problem, backup power source device 15 has boost circuit 27 in the output path of capacitor 25, as shown in FIG. 1 and FIG. 4. The output of boost circuit 27 is connected to door-lock-releasing output terminal 28. Thus, in case of emergency, e.g. battery 22 being damaged by an accident, the voltage of capacitor 25 is boosted by boost circuit 27 and supplied to each motor 19, i.e. a door-lock-releasing part, via door-lock-releasing output terminal 28. As a result, motor 19 is started at a sufficiently high voltage, and thus the door lock is appropriately released in case of emergency. Therefore, passengers can make emergency escape from automobile interior 10 shown in FIG. 2 to the outside. This enhances the safety.

Second Exemplary Embodiment

Figure 9:
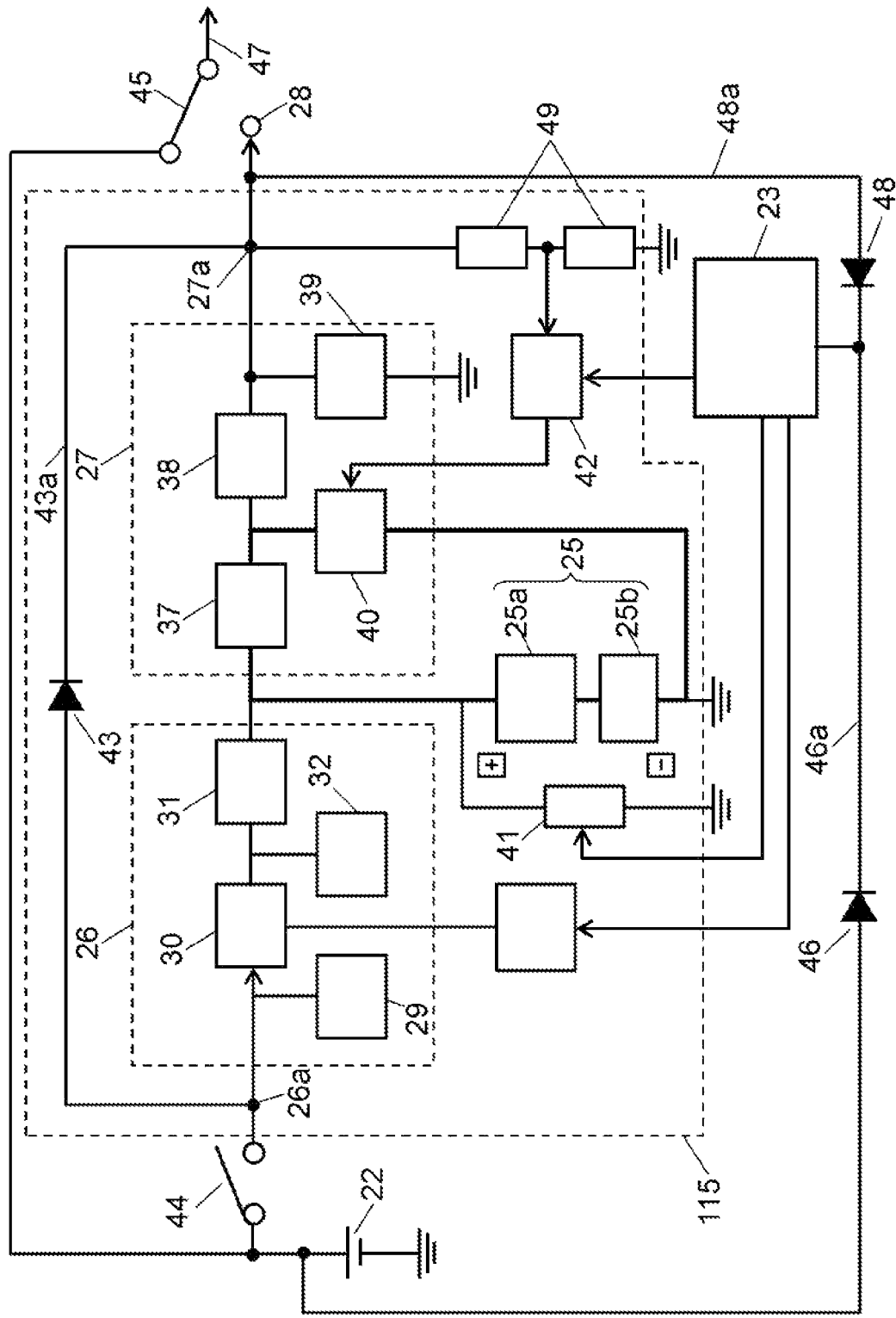
FIG. 9 is a block diagram showing an example of the connection between a backup power source device and an automobile equipped with the backup power source device in accordance with a second exemplary embodiment of the present invention.

FIG. 9 is a block diagram showing an example of the connection between a backup power source device and an automobile equipped with the backup power source device in accordance with the second exemplary embodiment of the present invention. Hereinafter, a description is provided for the exemplary embodiment where backup power source device 115 is connected to the automobile equipped with backup power source device 115. Naturally, backup power source device 115 is disposed in automobile interior 10 of automobile 9 shown in FIG. 2. Elements similar to those in the first exemplary embodiment have the same reference marks, and the detailed description of those elements is omitted in some cases.

As shown in FIG. 9, charging circuit 26 in backup power source device 115 is provided on the power supply side of capacitor 25. Charging circuit 26 charges capacitor 25. Boost circuit 27 is provided on the power discharge side of capacitor 25. Boost circuit 27 boosts the voltage when the electric power accumulated in capacitor 25 is discharged.

Door-lock-releasing output terminal 28 is connected to the output side of boost circuit 27. Charging circuit 26 steps down the voltage of battery 22 to a voltage appropriate for charging capacitor 25. The above configuration is similar to that of the first exemplary embodiment.

Further, in this exemplary embodiment, input end 26a of charging circuit 26 is connected to output end 27a of boost circuit 27 via first diode 43. The cathode side of first diode 43 is connected to output end 27a of boost circuit 27, and the anode side thereof is connected to input end 26a. First diode 43 is parallel-connected to charging circuit 26 and boost circuit 27. In the state where boost circuit 27 is stopped without any output from boost circuit 27, the electric power from battery 22 connected to input end 26a of charging circuit 26 is supplied to output end 27a of boost circuit 27 via first diode 43.

When electric power is normally supplied to input end 26a of charging circuit 26, backup power source device 115 does not start boost circuit 27. Thus, switching element 40 in boost circuit 27 does not perform switching operation.

That is, when automobile 9 shown in FIG. 2 is operated in a normal state, backup power source device 115 shown in FIG. 9 is in a standby state. This can suppress the noise that is caused by the operation of switching element 40 and emitted from boost circuit 27 to the outside.

Particularly, boost circuit 27 is required to be downsized and boost the voltage of capacitor 25 accumulating limited electric power or voltage. This tends to increase the noise caused by the switching operation. Thus, stopping the switching operation can suppress the effect of the noise on other in-vehicle devices. Naturally, power consumption caused by the switching operation can also be suppressed.

Only first diode 43 is connected to the bypass between input end 26a of charging circuit 26 and output end 27a of boost circuit 27. At output end 27a of boost circuit 27, it is only necessary to maintain a voltage at a predetermined level or higher. Thus, an impedance component, such as a resistor, may be series-connected to first diode 43 in the bypass between input end 26a of charging circuit 26 and output end 27a of boost circuit 27 so as to suppress the current flowing therein and to suppress the power consumption.

The operation of backup power source device 115 described above is the operation in the state where battery 22 is normally connected. Thus, regardless of whether ignition switch 44 is opened or closed, relay 45 does not connect door-lock-releasing output terminal 28 and door-lock releasing/closing terminal 47. Therefore, boost circuit 27 is not requested to output voltage by vehicle ECU 23 or control element 42.

When electric power supply from battery 22 to input end 26a of charging circuit 26 is stopped due to an accident in driving of automobile 9, backup of the electric power source is necessary. When such a state occurs, boost circuit 27 is started. The voltage accumulated in capacitor 25 is boosted by boost circuit 27, and the voltage after boosting is supplied to door-lock-releasing output terminal 28 via output end 27a. At this time, since automobile 9 is driven, ignition switch 44 is in the connected state at least immediately before the accident occurs. Thus, capacitor 25 is in the state where electricity has already been accumulated sufficiently through charging circuit 26.

Charging circuit 26 may charge capacitor 25 immediately after electric power is supplied to input terminal 26a. Alternatively, charging circuit 26 may regularly charge capacitor 25 after a predetermined time after charging the capacitor once.

Capacitor 25 discharges a small amount of electric charge with a lapse of time even when the capacitor does not supply electric power to boost circuit 27. Thus, it is preferable that charging circuit 26 regularly charges capacitor 25. With this configuration, capacitor 25 is always in the fully charged state or in a similar state when backup power source device 115 is requested to operate.

Similarly to the first exemplary embodiment, charging circuit 26 also includes switching element 30. The switching operation of switching element 30 allows DC-DC conversion. The switching operation caused by switching element 30 is a step-down operation and is not the operation performed within a limited, short time period. Thus, noise in charging circuit 26 is extremely smaller than that in boost circuit 27.

As described above, in backup power source device 115, input end 26a of charging circuit 26 is connected to output end 27a of boost circuit 27 via first diode 43. Hereinafter, a description is provided for the connection between the electronic control system of automobile 9 and backup power source device 115 and operations thereof when backup power source device 115 is installed in automobile 9.

First, a description is provided for the connection of the electronic control system and power source of automobile 9 to backup power source device 115. Ignition switch 44 operates in synchronization with ignition. Ignition switch 44 is connected to input end 26a of charging circuit 26 of backup power source device 115. That is, battery 22 and charging circuit 26 are connected via ignition switch 44.

A node of battery 22 and ignition switch 44 is connected to vehicle ECU 23 via second diode 46. In detail, the cathode side of second diode 46 is connected to vehicle ECU 23.

Further, a node of battery 22 and ignition switch 44 is connected to relay 45. In the state where battery 22 is normally connected, regardless of whether ignition switch 44 is closed or not, relay 45 is connected to battery 22. With this configuration, battery 22 supplies electric power to door-lock releasing/closing terminal 47 via relay 45.

The normal state means the state where electric power supply from battery 22 is not stopped due to the above accident, that is, the state where battery 22 is connected. Naturally, the door lock in the normal state can be closed or released optionally via door-lock releasing/closing terminal 47.

When electric power supply from battery 22 to charging circuit 26 is stopped due to an accident, vehicle ECU 23 or control element 42 operate switching element 40 of boost circuit 27 based on the information on power shutoff. Then, the operation of switching element 40 boosts the electric power accumulated in capacitor 25, and the electric power for releasing the door lock is output from output end 27a to the side of door-lock-releasing output terminal 28.

Simultaneously with this operation, the connection of relay 45 is switched from the side of battery 22 to the side of door-lock-releasing output terminal 28. As a result, the electric power for releasing the door lock can be supplied to door-lock releasing/closing terminal 47. This electric power and the instruction from vehicle ECU 23 forcibly release the door lock.

Figure 10:
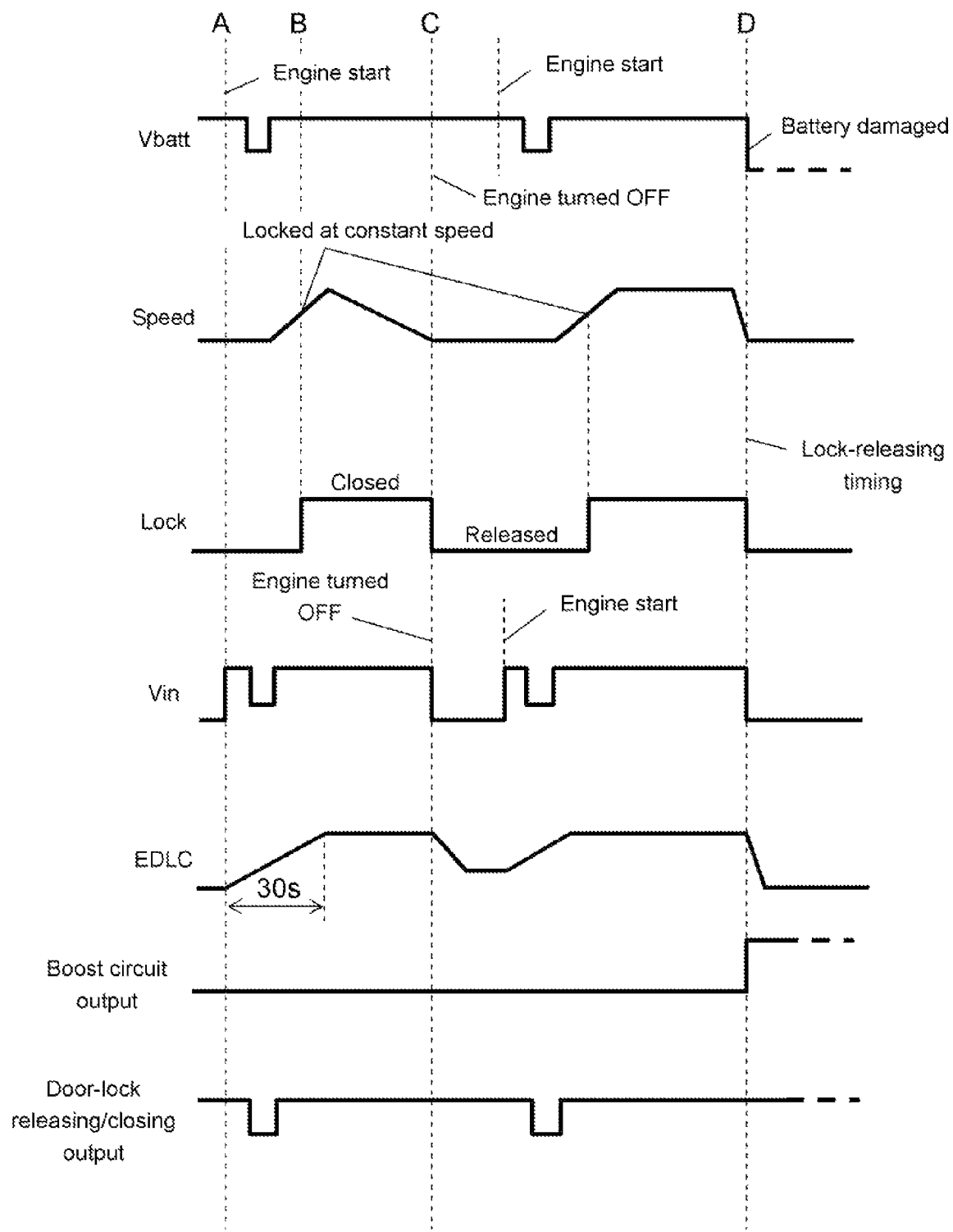
FIG. 10 is a time-sequence diagram showing an example of operating states of the automobile equipped with the backup power source device and a boost circuit in accordance with the second exemplary embodiment.

Next, with reference to FIG. 10, a description is provided for the operations in the configurations shown in FIG. 1 through FIG. 3 and FIG. 9.

FIG. 10 is a time-sequence diagram showing an example of operating states of the automobile equipped with backup power source device 115 and the boost circuit.

The curve of "Vbatt" shows variations in the voltage of the battery, i.e. a main electric power source. The curve of the speed shows changes in automobile speed. The curve of "Lock" shows changes in door lock state, i.e. closed or released. The curve of "Vin" shows variations in the voltage of the charging circuit given from the battery. The curve of "EDLC" shows variations in the charging voltage of the capacitor. The curve of "boost circuit output" shows variations in the output voltage of the boost circuit. The curve of "door-lock releasing/closing output" shows variations in the output voltage of the door-lock releasing/closing terminal.

Boost circuit 27 does not operate before the timing (at point D) at which an accident occurs. Thus, as shown in the boost circuit output curve in FIG. 10, boost circuit 27 outputs a voltage after battery 22 has been damaged. With this configuration, as shown in FIG. 10, at the timing at which the battery voltage is lost as shown in the Vbatt curve, the door-lock releasing/closing output curve becomes a curve obtained by superimposing the Vbatt curve on the boost circuit output curve. Thus, after an accident has occurred, the output voltage of door-lock-releasing output terminal 28 becomes High. This electric power supplied to door-lock releasing/closing terminal 47 can release the door lock. That is, regardless of before or after occurrence of the accident, electric power can always be supplied to door-lock releasing/closing terminal 47.

In normal driving of automobile 9, ignition switch 44 is closed and door-lock-releasing output terminal 28 is not connected to door-lock releasing/closing terminal 47. As described earlier, in this state, boost circuit 27 is ready to operate but is stopped. This configuration can suppress noise emitted from switching element 40 of boost circuit 27.

Preferably, the cross-sectional area of first conductor path 43a having first diode 43 connected therein is smaller than the cross-sectional area of second conductor path 46a having second diode 46 connected therein. This configuration can suppress the effect, on first conductor path 43a, of various types of noise radiated from the inside and outside of backup power source device 115. As a result, this can also suppress the adverse effect on the operations of switching element 30 and switching element 40 that are connected or disposed in the proximity to first conductor path 43a.

That is, second conductor path 46a needs to always continue electric power supply for driving vehicle ECU 23 to vehicle ECU 23. Thus, in consideration of electric power loss, second conductor path 46a needs a large cross-sectional area at a low resistance value. In contrast, first conductor path 43a only needs to ensure sufficient voltage to allow transmission of a micro signal to output end 27a of boost circuit 27. Thus, a conductor having a small cross-sectional area may be used as first conductor path 43a.

Further, it is preferable to connect third diode 48 between output end 27a of boost circuit 27 and vehicle ECU 23, connect voltage divider circuit 49 between output end 27a and the ground, and input the divided voltage from voltage divider circuit 49 to control element 42. This configuration can suppress instantaneous deterioration of the function of vehicle ECU 23. Thus, after battery 22 has been damaged by an accident, vehicle ECU 23 can continue the function thereof.

At a time point when, due to the damage of battery 22, the divided voltage supplied from voltage divider circuit 49 to control element 42 becomes lower than a predetermined voltage, boost circuit 27 receives the instruction from control element 42 and starts operation. Simultaneously, the voltage at output end 27a drops rapidly, and thus smoothing capacitor 39 connected to output end 27a in boost circuit 27 starts discharge to vehicle ECU 23 via third diode 48. Smoothing capacitor 39 has been charged by battery 22 via first diode 43 in the period until the electric power supply from battery 22 is stopped. Thus, the smoothing capacitor is ready to discharge electric power even when boost circuit 27 is not started, in the period until the electric power supply is stopped.

A time lag is caused until boost circuit 27 outputs the boosted voltage in response to the starting instruction. Then, the discharge voltage from smoothing capacitor 39 compensates for a decrease in the voltage of door-lock-releasing output terminal 28 caused by the presence of this time lag. Thus, the voltage for driving vehicle ECU 23 after the damage of the battery is a voltage obtained by superimposing the discharge voltage of smoothing capacitor 39 on the output voltage of boost circuit 27.

Figure 11:
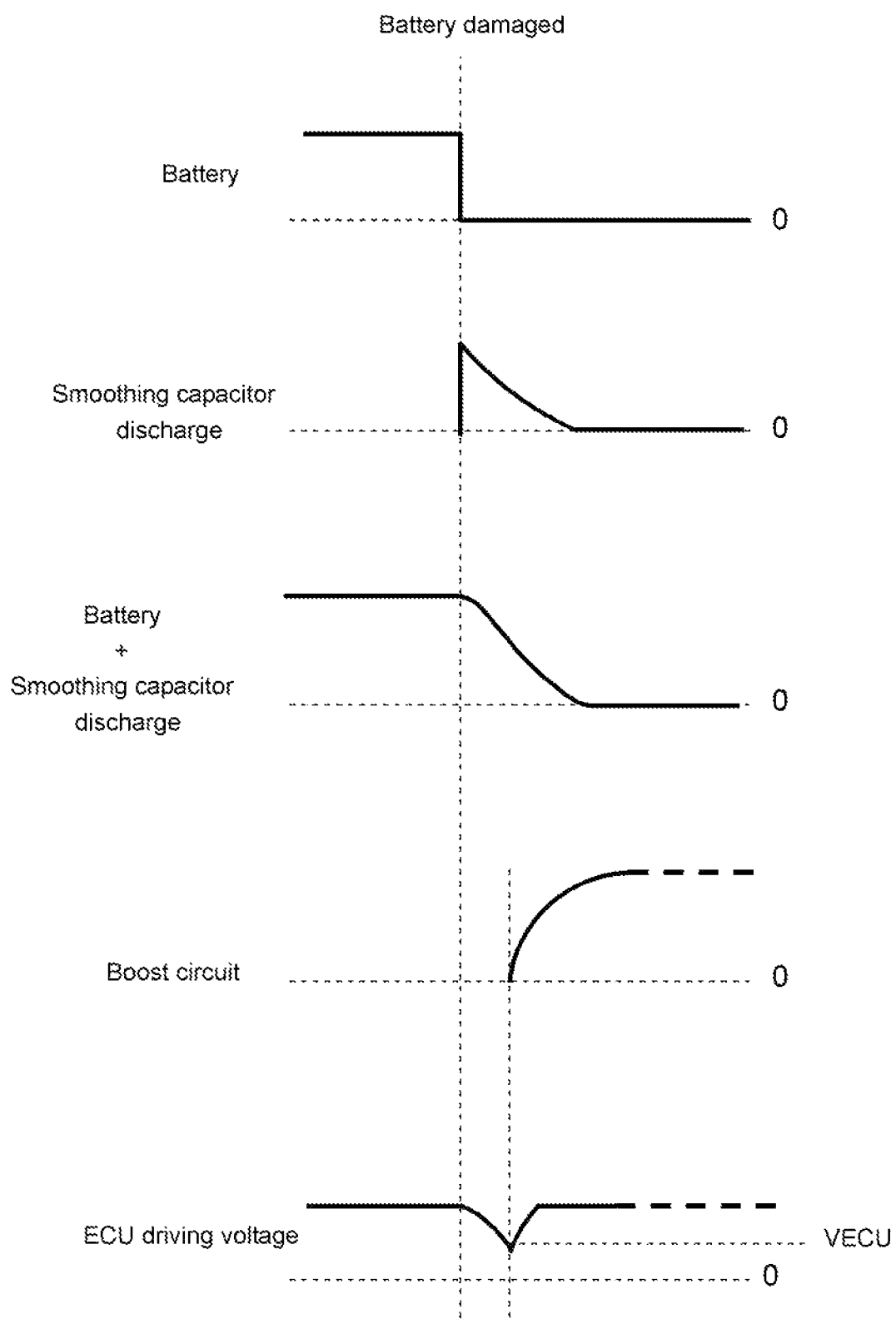
FIG. 11 is a time-sequence diagram showing an example of the operating states of the backup power source device in accordance with the second exemplary embodiment.
Figure 12:
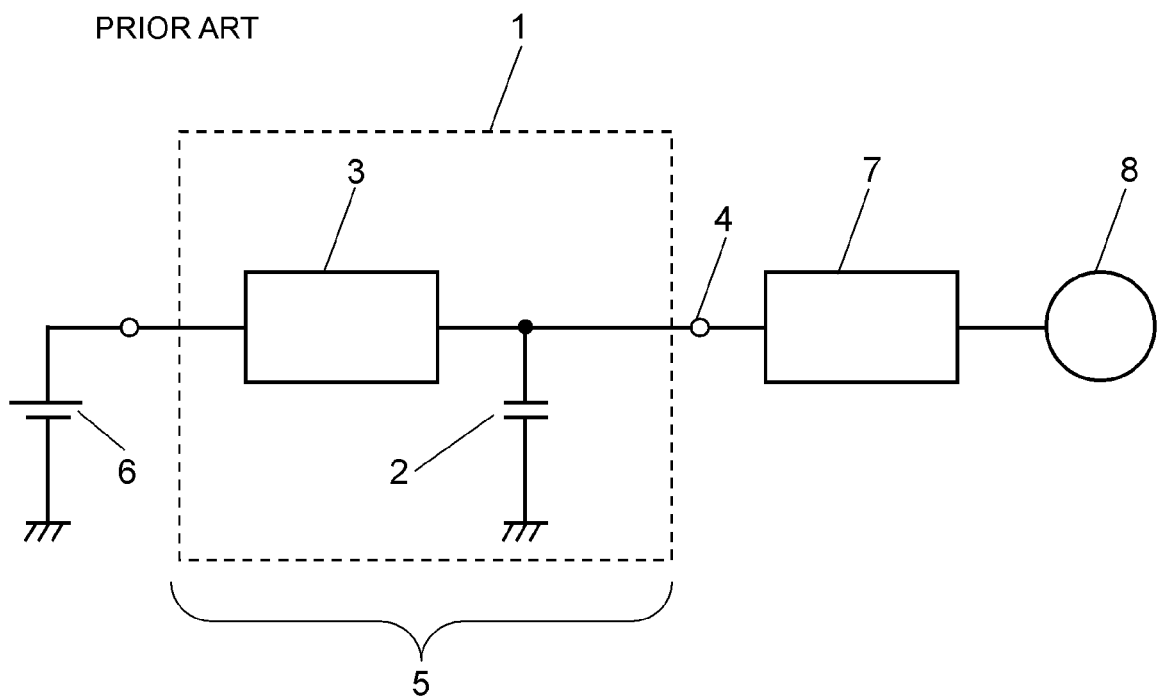
FIG. 12 is a circuit block diagram of a conventional backup power source device.

Next, a description is provided for the driving voltage of vehicle ECU 23 with reference to FIG. 11.

FIG. 11 is a time-sequence diagram showing an example of the operating states of backup power source device 115. As shown by the battery curve in the operation sequence of the operating states in FIG. 11, the battery voltage becomes "0" at the time point when battery 22 is damaged. Simultaneously, as shown by the curve of the smoothing capacitor discharge, the voltage of smoothing capacitor 39 decreases along the discharge curve, and the voltage where the battery curve is superimposed on the smoothing capacitor discharge curve is obtained at output end 27a. Then, with a time difference from the time point of damage of battery 22, for example, the voltage shown by the curve of the boost circuit starts. With this configuration, the ECU driving voltage obtained by superimposing the battery curve and the smoothing capacitor discharge curve on the boost circuit curve is supplied to vehicle ECU 23. The capacity of smoothing capacitor 39 is defined such that the voltage resulting from the instantaneous drop in ECU driving voltage is higher than the voltage capable of driving vehicle ECU 23. However, this time lag is an extremely short period, and it is sufficient that the capacity of smoothing capacitor 39 is substantially equal to the capacity of a smoothing capacitor to be used for a general smoothing function. That is, smoothing capacitor 39 has both of a smoothing function during boost circuit 27 in operation and a function of a small storage battery before the operation of boost circuit 27.

A time lag is caused from the state where the operation of boost circuit 27 is stopped for noise suppression to the time when control element 42 receives the boosting instruction and boost circuit 27 starts operation. However, the electric charge accumulated in smoothing capacitor 39 is supplied to vehicle ECU 23 via third diode 48, as instantaneous compensation electric power. Thus, the voltage at output end 27a can be maintained at a voltage capable of continuously driving vehicle ECU 23.

With this configuration, vehicle ECU 23 can continue stable operation such that the operation is not interrupted or stopped and the function thereof is not impaired, even when electric power supply from battery 22 is stopped. Particularly, all the operations for releasing the door locks are not performed instantaneously, and continuous control and operations for an extend period of time are necessary. Thus, continuous electric power supply to vehicle ECU 23 is useful for ensuring the safety.

That is, backup power source device 115 can maintain stable operation, as an emergency electric power source, using the limited electric power accumulated therein, in addition to suppression of the effect of noise.

Since smoothing capacitor 39 uses part of the function of boost circuit 27, no additional capacitance element needs to be added. This can suppress increases in the mounting area and costs caused by the additional capacitance element.

Further, third diode 48 is turned on only for a short time period in case of emergency. Thus, it is sufficient that the cross-sectional area of third conductor path 48a is smaller than the cross-sectional area of second conductor path 46a. Similarly to first conductor path 43a, this configuration can suppress noise radiated to third conductor path 48a Further, since electric power is supplied to vehicle ECU 23 through second conductor path 46a in normal operation, electric power loss can be reduced.

In the order of operations in backup power source device 115 in case of emergency described above, when it is determined that battery 22 is disconnected from the circuit due to an accident or breaking of wire, boost circuit 27 starts operation and the door locks are released. However, the order of operations in backup power source device 115 in case of emergency is not limited to the above. Vehicle ECU 23 can continue operation due to continuous power supply as described earlier. Thus, the timing of the door-lock-releasing operation is not limited to the instant at which boost circuit 27 starts operation in response to determination of no electric power from battery 22, or immediately after the instant.

For instance, in case of emergency, such as an accident, the following configuration may be used. Vehicle ECU 23 determines that automobile 9 has stopped completely or vehicle ECU 23 determines that a predetermined time has elapsed since the accident. Thereafter, in response to the instruction from vehicle ECU 23, relay 45 is switched to the side of door-lock-releasing output terminal 28 for connection thereto, so that the door locks can be released. This configuration can prevent passengers from being thrown to the outside in the state where automobile 9 is not stopped, thereby further ensuring the safety of the passengers. The predetermined time described herein can be set to various values in consideration of the safety of the passengers. For instance, the predetermined time may be a time period from when the function, such as an airbag, that needs to be started at the instant of the accident starts operation to when vehicle ECU 23 determines the completion of the operation. Alternatively, a time period from when the function, such as an airbag, that needs to be started at the instant of the accident starts operation to the completion of the operation is preset. This time period may be set to the predetermined time.

Alternatively, the following configuration also may be used. When an inertial sensor (not shown), for example, connected to vehicle ECU 23 detects an impact equal to or larger than a predetermined magnitude and thus vehicle ECU 23 determines occurrence of an accident, boost circuit 27 starts operation regardless of whether battery 22 normally supplies electric power or not. Next, vehicle ECU 23 determines that the automobile has stopped or a predetermined time period has elapsed since the accident. Then, regardless of whether battery 22 is connected or not, first, releasing of the door locks is attempted using the electric power from battery 22. Thereafter, backup power source device 115 switches relay 45, so that the door locks are released by the electric power from boost circuit 27. This configuration can prevent passengers from being thrown to the outside in the state where automobile 9 is not stopped. This can further ensure the safety of the passengers. Further, when automobile 9 is in an unstable state after the accident, vehicle ECU 23 causes both battery 22 and backup power source device 115 to supply electric power to door-lock releasing/closing terminal 47. Thus, automobile 9 including backup power source device 115 can enhance reliability of releasing of the door locks.

As described above, this exemplary embodiment has the following advantages.

The first advantage is that boost circuit 27 is not started by the control of vehicle ECU 23 or control element 42 in a normal connection state where electric power is supplied to input end 26*a* of charging circuit 26. Thus, switching element 40 in boost circuit 27 does not perform switching operation. However, smoothing circuit 39 is charged.

As a result, when automobile 9 is driven in the normal state, backup power source device 115 is in the standby state and thus noise emitted from boost circuit 27 to the outside can be suppressed. Particularly, boost circuit 27 is required to be downsized and boost the voltage of capacitor 25 accumulating limited electric power and voltage. This tends to increase the noise caused by the switching operation of boost circuit 27. Thus, stopping the switching operation as described above can suppress the effect of the noise on other in-vehicle devices.

In the normal driving state, first, electric power is supplied to vehicle ECU 23 via second diode 46. Thus, boost circuit 27 can be started normally.

At this time, ignition switch 44 is in the closed state, and thus capacitor 25 is charged through charging circuit 26. However, in the charging time, the voltage at output end 27*a* of boost circuit 27 is kept in the high state. Thus, in this state, boost circuit 27 does not start.

That is, while automobile 9 is driven in the normal state, backup power source device 115 is in the standby state (a state where capacitor 25 is charged) and boost circuit 27 does not start. As a result, noise emitted to the outside from boost circuit 27 can be suppressed.

The second advantage is as follows. Under the situation where electric power supply from battery 22 to vehicle ECU 23 is stopped due to an accident, for example, in the above state, the electric power charged in smoothing capacitor 39 is supplied to vehicle ECU 23 via third diode 48. This reduces variations in the electric power supplied from output end 27*a* of boost circuit 27 to vehicle ECU 23, so that vehicle ECU 23 can continue stable operation.

Further, vehicle ECU 23 immediately detects that electric power supply from battery 22 has been stopped due to the above accident, and then attempts to start safety operation (releasing of the door locks). In order to enhance the reliability in the transition period toward the safety operation, smoothing capacitor 39 supplies electric power to vehicle ECU 23 via third diode 48.

When electric power supply from battery 22 is stopped due to the above accident, the voltage supplied to voltage divider circuit 49 via first diode 43 also drops rapidly. Thus, in response to the voltage drop in voltage divider circuit 49, control element 42 is turned on. The operating instruction is given directly from voltage divider circuit 49 to control element 42. This can shorten the time from when electric power supply from battery 22 is stopped to when boost circuit 27 starts operation.

That is, even if electric power supply from battery 22 to vehicle ECU 23 via second diode 46 is stopped due to an accident, for example, vehicle ECU 23 continues the operation at the output voltage of boost circuit 27 and detects occurrence of abnormality in the vehicle at the same time. This allows reliable operation for ensuring the safety even if an accident occurs in the vehicle. Thus, reliability of the safety can be enhanced.

As a result of turn-on of switching element 40 via control element 42, boost circuit 27 is started. The boosting operation is performed using the electric charge accumulated in capacitor 25. This boosted high voltage starts motors 19 via door-lock-releasing output terminal 28, and can ensure releasing of the door locks.

When vehicle ECU 23 determines occurrence of an accident, relay 45 is switched to the side of door-lock-releasing output terminal 28. Thereby, the door locks are released as described above.

The above description includes the operation of boost circuit 27 in the normal state where battery 22 supplies electric power, and in the abnormal state where electric power supply from battery 22 is stopped due to an accident, for example. In the case where battery 22 is exhausted and is removed from the vehicle for replacement, the engine of the vehicle is stopped and thereafter an operator replaces battery 22. At this time, vehicle ECU 23 has already detected that ignition switch 44 is opened in response to the instruction of stopping the engine. Thus, even when battery 22 is removed in this state, vehicle ECU 23 does not start boost circuit 27.

INDUSTRIAL APPLICABILITY

As described above, in the present invention, noise is suppressed in normal operation, and the stable operation of a power source can be maintained using limited small electric power accumulated, in case of emergency. As a result, door locks can be released appropriately in case of emergency. Thus, the present invention is useful as a backup power source device for use in various automobiles.

REFERENCE MARKS IN THE DRAWINGS

9 Automobile
10 Automobile interior
11 Driver's seat
12 Front passenger seat
13 Rear seat
14 Steering wheel
15, 115 Backup power source device
16 Dashboard
17 Door
18 Door lock
19 Motor
20 Door knob
21 Mechanical key
22 Battery
23 Vehicle ECU (electronic control unit)
24 Body case
25, 25*a*, 25*b* Capacitor
26 Charging circuit
26*a* Input end
27 Boost circuit
27*a* Output end
28 Door-lock-releasing output terminal
29 Capacitor
30 Switching element
31 Choke coil
32 Diode
33 Control element
34 Substrate 34a Connector
35 End opening
36 Lid
36a Opening
37 Boost coil
38 Diode
39 Smoothing capacitor
40 Switching element
41 Discharging circuit
42 Control element
43 First diode
43a First conductor path
44 Ignition switch
45 Relay
46 Second diode
46a Second conductor path
47 Door-lock releasing/closing terminal
48 Third diode
48a Third conductor path
49 Voltage divider circuit
50 Discharge pattern
51 Wiring pattern

The invention claimed is:

1. A backup power source device comprising:
a capacitor;
a charging circuit provided in a charging path of the capacitor and performing step-down operation;
a boost circuit provided in an output path of the capacitor; and
a door-lock-releasing output terminal connected to the boost circuit,
wherein the boost circuit has a switching element and a boost coil disposed on a first side of a substrate, and
the capacitor is disposed on a second side of the substrate opposite to the first side, and series-connected to the switching element and the boost coil.

2. An automobile comprising:
an automobile body;
a door attached to the automobile body and including a door lock and a door-lock-releasing part;
a battery installed in the automobile body;
a backup power source device connected to the battery and disposed in an interior of the automobile body, the backup power source device including:
a capacitor;
a charging circuit provided in a charging path of the capacitor and performing step-down operation;
a boost circuit provided in an output path of the capacitor; and
a door-lock-releasing output terminal connected to the boost circuit;
a vehicle electronic control unit (ECU) for starting the boost circuit of the backup power source device and driving the door-lock-releasing part, using an output of the boost circuit; and
an engine,
wherein the backup power source device further includes a discharging circuit for discharging the capacitor and stopping the discharge in a state where electric charge of the capacitor is left,
in a state where electric power is supplied from the battery to the vehicle ECU, the vehicle ECU starts the discharging circuit depending on a state of whether the engine is started or stopped, and
in a state where no electric power is supplied from the battery to the vehicle ECU, the vehicle ECU starts the boost circuit and drives the door-lock-releasing part, using the output of the boost circuit.

3. An automobile comprising:
an automobile body;
a door attached to the automobile body and including a door lock and a door-lock-releasing part;
a battery installed in the automobile body;
a backup power source device connected to the battery and disposed in an interior of the automobile body, the backup power source device including:
a capacitor;
a charging circuit provided in a charging path of the capacitor and performing step-down operation;
a boost circuit provided in an output path of the capacitor; and
a door-lock-releasing output terminal connected to the boost circuit;
a vehicle electronic control unit (ECU) for starting the boost circuit of the backup power source device and driving the door-lock-releasing part, using an output of the boost circuit;
an ignition switch connected between the battery and a side of an input end of the charging circuit of the backup power source device;
a first diode connected between the input end of the charging circuit and an output end of the boost circuit;
a second diode connected between the vehicle ECU and a node of the battery and the ignition switch; and
a third diode connected between the vehicle ECU and the output end of the boost circuit,
wherein a side of a cathode of the first diode is connected to a side of the output end of the boost circuit, and a side of an anode of the first diode is connected to the input end of the charging circuit,
a side of a cathode of the second diode is connected to the vehicle ECU, and a side of an anode of the second diode is connected to a side of the node of the battery and the ignition switch, and
a side of a cathode of the third diode is connected to the vehicle ECU, and a side of an anode of the third diode is connected to the output end of the boost circuit.

4. The automobile of claim 3, further comprising:
a first conductor path for connecting the anode and the cathode of the first diode;
a second conductor path for connecting the anode and the cathode of the second diode; and
a third conductor path for connecting the anode and the cathode of the third diode,
wherein a cross-sectional area of the first conductor path and a cross-sectional area of the third conductor path are smaller than a cross-sectional area of the second conductor path.

5. An automobile comprising:
an automobile body;
a door attached to the automobile body and including a door lock and a door-lock-releasing part;
a battery installed in the automobile body;
a backup power source device connected to the battery and disposed in an interior of the automobile body, the backup power source device including:
a capacitor;
a charging circuit provided in a charging path of the capacitor and performing step-down operation;
a boost circuit provided in an output path of the capacitor; and
a door-lock-releasing output terminal connected to the boost circuit;

a vehicle ECU for driving the door-lock-releasing part, using an output of the boost circuit of the backup power source device;
an ignition switch connected between the battery and a side of an input end of the charging circuit of the backup power source device;
a first diode connected between the input end of the charging circuit and an output end of the boost circuit;
a second diode connected between the vehicle ECU and a node of the battery and the ignition switch;
a third diode connected between the vehicle ECU and the output end of the boost circuit;
a control element for starting the boost circuit; and
a voltage divider circuit connected to the output end of the boost circuit,
wherein a side of a cathode of the first diode is connected to a side of the output end of the boost circuit, and a side of an anode of the first diode is connected to the input end of the charging circuit,
a side of a cathode of the second diode is connected to the vehicle ECU, and a side of an anode of the second diode is connected to a side of the node of the battery and the ignition switch,
a side of a cathode of the third diode is connected to the vehicle ECU, and a side of an anode of the third diode is connected to the output end of the boost circuit,
the boost circuit has a smoothing capacitor connected to the output end of the boost circuit, and
the control element starts the boost circuit in response to a voltage dividing signal supplied from the voltage divider circuit or a signal supplied from the vehicle ECU.

* * * * *